United States Patent [19]

Rusche et al.

[11] Patent Number: 5,130,795
[45] Date of Patent: Jul. 14, 1992

[54] POSITIVE AUTOMATIC TARGET LOCATOR INDENTIFICATION SYSTEM (ATLIS), FOR ATR SYSTEM TESTING

[75] Inventors: Gerald A. Rusche, Fairfax City; John C. Neubauer, Fairfax Station, both of Va.

[73] Assignee: The United States of America as represented by the Secretary of the Army, Washington, D.C.

[21] Appl. No.: 656,315

[22] Filed: Feb. 19, 1991

[51] Int. Cl.⁵ .............................................. H04N 7/18
[52] U.S. Cl. ....................................... 358/108; 382/17
[58] Field of Search .............. 358/125, 126, 107, 108; 382/17, 61

[56] References Cited

U.S. PATENT DOCUMENTS

| | | | |
|---|---|---|---|
| 4,125,828 | 11/1978 | Resnick et al. | 382/17 X |
| 4,477,829 | 10/1984 | Ziman et al. | 382/17 X |
| 4,527,198 | 7/1985 | Callahan | 358/125 |
| 4,881,270 | 11/1989 | Knecht et al. | 382/17 |
| 5,023,709 | 6/1991 | Kita et al. | 358/125 |

Primary Examiner—Victor R. Kostak
Attorney, Agent, or Firm—Milton W. Lee; John E. Holford; Anthony T. Lane

[57] ABSTRACT

A method and means for positively identifying and locating a plurality of moving test targets during a test of Automatic Target Recognition (ATR) equipment. The targets are identified by attached unique narrow band unmodulated visible light sources and are located by the type of video signal they generate in a synchronously filtered black and white video camera.

5 Claims, 3 Drawing Sheets

| FILTER NUMBER | WAVELENGTH | BINARY |
|---|---|---|
| 1 | 400 - 410 | 0001 |
| 2 | 420 - 430 | 0010 |
| 3 | 440 - 450 | 0011 |
| 4 | 460 - 470 | 0100 |
| 5 | 480 - 490 | 0101 |
| 6 | 500 - 510 | 0110 |
| 7 | 520 - 530 | 0111 |
| 8 | 540 - 550 | 1000 |
| 9 | 560 - 570 | 1001 |
| 10 | 580 - 590 | 1010 |

POSITIVE AUTOMATIC TARGET LOCATOR INDENTIFICATION SYSTEM (ATLIS), FOR ATR SYSTEM TESTING

The invention described herein may be manufactured, used, and licensed by the U.S. Government for governmental purposes without the payment of any royalties thereon.

BACKGROUND OF THE INVENTION

1. Field of the Invention

The invention is concerned with a system and a method for testing Automatic Target Recognition (ATR) equipment, particularly ATR equipment which employs optical sensors in the visible, near visible or far infrared.

2. Prior Art

With the tremendous increases in the speed and accuracy of weapon delivery systems, there is a growing need for an ATR system reliable enough to fire weapons without human intervention. As primary functions; the ATR system must first detect a target, store its x, y and z coordinates and identify the target from its visible image, infrared image, radar image, sonar image, etc. If this is done accurately, the remaining secondary functions of automatically selecting a suitable weapon, aiming and firing it; are easily within the state of the art. During a test, the results of the first functions are recorded versus real time as the test progresses. To evaluate these results, a similar record of "truth" about the targets must be available as the results are provided.

One possible method of providing the needed "truth" is to predesign the test scenario, so that the positions of all targets is a predetermined function of time. In addition to being very difficult, this method makes the test inflexible and subject to unrecorded errors. A second method would be to have each target report its position by radio. This, however, makes the targets more vulnerable to the ATR equipment. It is also distracting to the target personnel and prone to error. Similar problems occur when the target positions are determined with radar or similar active type locators.

An object of the present invention is therefore to provide a means and method for locating ATR test targets which does not degrade the test results, requires a minimum effort from the target operators, and still provides complete flexibility of target maneuvers during the test.

SUMMARY OF THE INVENTION

The present invention solves the above problem by providing an extremely narrow band visible light source on each vehicle, the source having a specific wavelength to identify the target. The light sources are periodically scanned through light filters in a fixed test monitor and the configuration of the sources are such that the range to each target may be extracted along with its x-y position in the monitor3 s focal plane. A novel Automatic Target Locator and Identification System (ATLIS) is provided to record simultaneously the targets position and test results from the ATR system under test for subsequent evaluation.

BRIEF DESCRIPTION OF THE DRAWINGS

The invention is best understood with reference to the drawings; wherein.

DESCRIPTION OF THE PREFERRED EMBODIMENT

The invention provides a means and method for using a single fixed monitor to record the identity and position of a group of moving targets, as a function of real time as well as similar values obtained by an ATR system undergoing test. The method involves the following steps:

1. Mounting and arranging a source of fisible radiation on each target preferably so as to always present substantially the same radiating surface normal to the monitor, the source being limited to an extremely narrow band of wavelengths unique for each target;

2. Scanning the targets with a TV-type camera so as to obtain a standard video signal defining a series of fields divided into scan lines and the latter divisible into pixels with different analog values;

3. Introducing a filter, having the same bandwidth as one of the above sources, between the camera and the targets for a sampling period equal to at least two consecutive field scans;

4. Sampling the intensity and x-y position of each pixel within said sampling period;

5. Separately prestoring the x-y position of the first and last pixel in each line, having an intensity above a preselected threshold and/or the most intense pixel, during the sampling period;

6. Computing and permanently storing the x-y position of the most intense pixel and/or an average x-y position and the average difference between the first and last x-y positions for each line; from all the prestored x-y positions from the same sampling period;

7. Reading and storing a digital bar code identification of the filter associated with the sampling period as well as target data generated by any ATR being tested during the same period.

Figure 1:
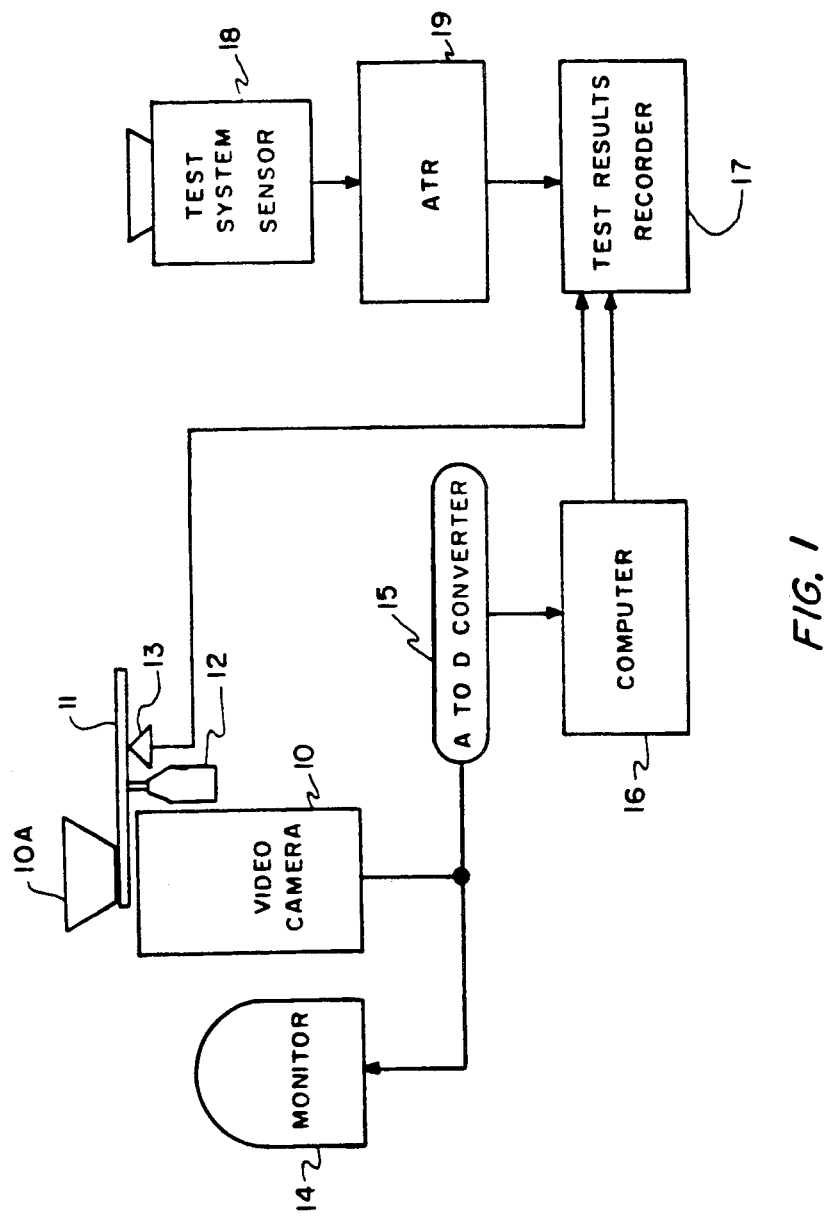
FIG. 1 shows a block diagram of the ATLIS system, according to the invention.

FIG. 1 shows a block diagram of a system to perform the above test method. The system avoids the heavy dependence on infrared, far-infrared and radar employed by most ATR's by locating the targets with an ordinary video camera 10 sensitive only to a fraction of the visible spectrum. Each target is assigned a very narrow frequency band and a corresponding filter for each is periodically inserted in the optical path 10A of the camera. These filters are mounted in a round shutter 11. The shutter carries bar codes to identify each filter. The shutter is mounted in the optical path and rotated by an electric motor 12. A set of sensors 13 mounted on the camera or the motor reads the angular position of the shutter as the filters pass sequentially through the optical path. The shutter is synchronized with the camera scan frequencies, so that each filter remains in the optical path for an integral number of fields.

The scene viewed by the camera is transmitted by video as well as horizontal and vertical synchronization signals to a monitor 14. These same signals are also sent to an analog-to-digital converter 15 which samples and digitizes the magnitude of each of these signals for each pixel into its x-y and intensity components for normalization by a computer 16. The computer data and the filter data from sensor set 13 is recorded by the Test Result Recorder 17, which may be a multichannel tape recorder. At the same time test results from the test system sensor 18, which may include many active or passive sensors for light, RF, sound, etc.; are combined and analyzed by the ATR 19 and stored by recorder 17.

Figures 2, 3:
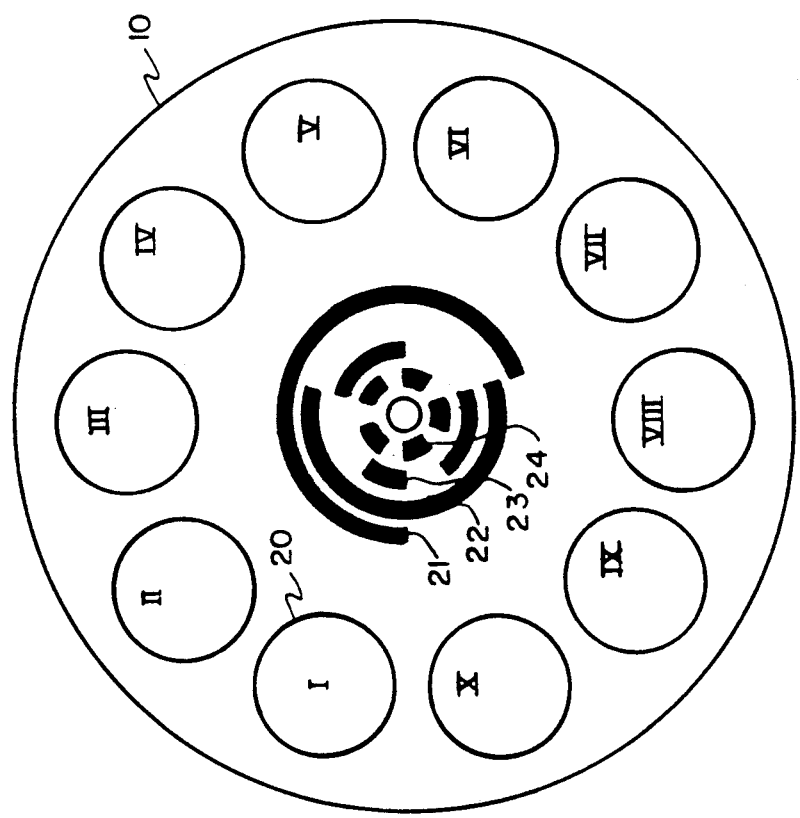
FIG. 2 shows the details of the filter shutter of the ATLIS system in FIG. 1.
FIG. 3 shows a portion of the raster scan and target image as seen in the monitor from FIG. 1.

FIG. 2 shows a plan view of shutter 10. The shutter contains a plurality of circular apertures, such as aperture 20, much larger than the lens aperture of the camera. At the center of each aperture's scan the center of the aperture coincides with the center of the lens. This modification has ten filters as indicated by the roman numerals. Nearer the center are concentric rings, such as, 21-24 which are divided into sectors alternately painted black and white. When these are viewed through a radial slit by sensors they generate a sequence of bar codes wherein black is zero and white is 1, or the reverse, in a manner well understood in the art. Each bar code identifies an angular segment of the shutter occupied by a different filter.

FIG. 3 shows a table of filter characteristics for a suitable set of ten filters. The filter numbers correspond to the roman numerals in the preceding figure. The column entitled "WAVELENGTH" gives the upper and lower cutoff wavelengths in nanometers. The bandwidth of each filter is limited to 10 nm with a guard band of 10 nm between each filter, so that the system has an overall bandwidth of about 200 nm. While this is a substantial fraction of the visible spectrum, it still leaves a greater fraction for the ATR. ATR's rely very little on visible radiation and less on visible coloration of the target. If any visible light sensors are present in the ATR the ATLIS filters must be chosen to avoid their sensitivity bands or filters added to the ATR for test purposes. Corresponding binary signatures for each filter detected by the sensor set 13 are shown in the third column of FIG. 3, corresponding tot he code shown in FIG. 2.

Figure 4:
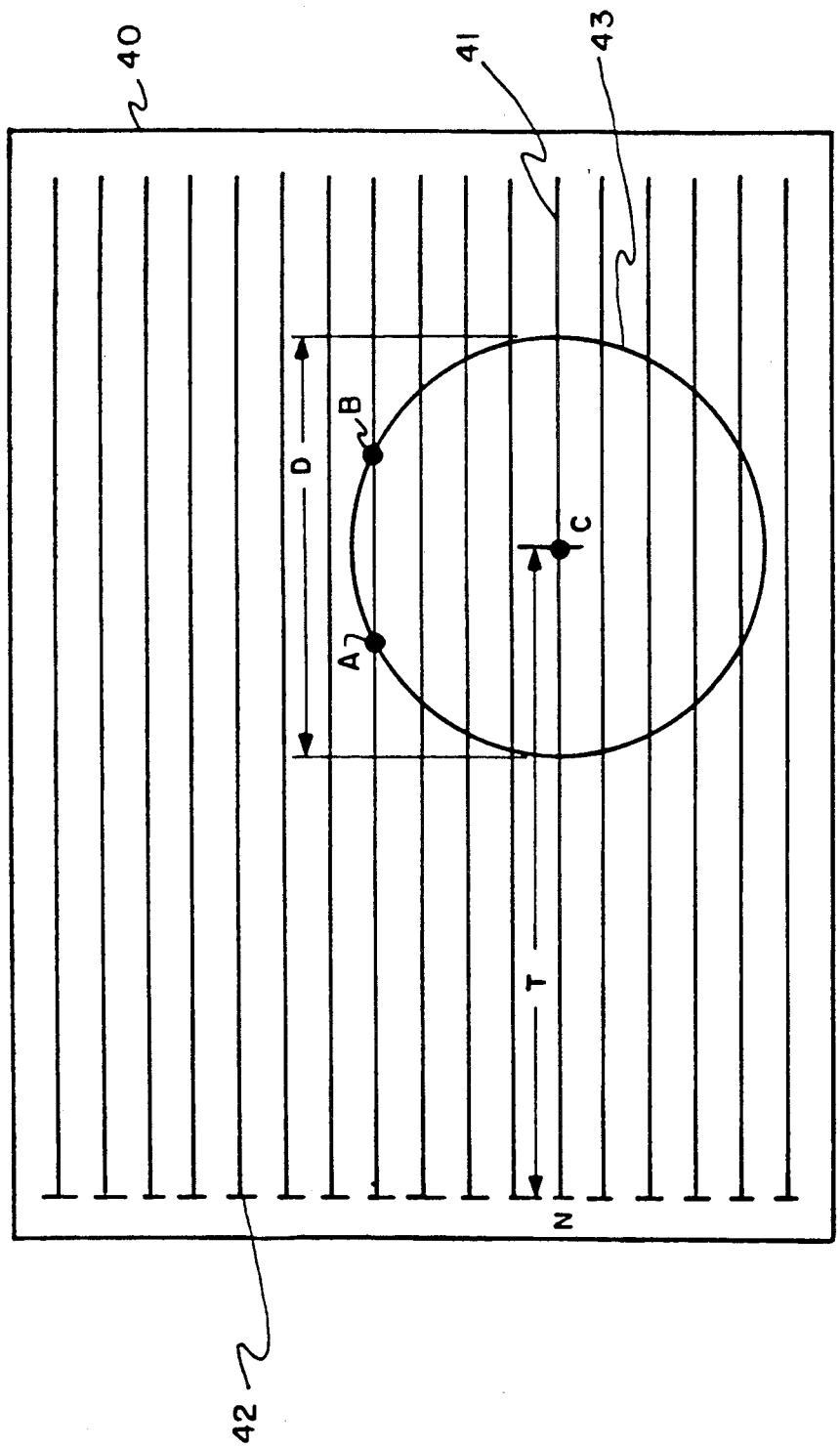
FIG. 4 shows a table of typical filter characteristics for the shutter in FIG. 2.

FIG. 4 shows a portion of the raster scan 40 for one field as seen on the monitor in FIG. 1. The raster is formed by a series of lines 41 originating at one edge 42 of the picture. The target may appear as circular bright spot 43, provided that the light source on the target is made circular in shape. The corresponding video and synchronization signals are normalized by the computer, previously mentioned, to provide an x-y position and range for each target in sequence. A target pixel is defined by its intensity which most exceed a given threshold, for example, the threshold may be half the intensity of the most intense pixel detected. If the time from the beginning of the scan until the target is first detected were recorded as target position, this would identify point A as the x-y position of the target. Since the target is actually spread over a number of pixels in a number of lines in the scan, a more accurate position, point C, can be obtained by recording the times from detection, point A, to loss of detection, point B, repeating this for every line in which detection occurs and recording an average value. This will be very close to the value (N times t)+T, where N is the number of the line containing the center of the target C, t is the time to scan a full line and T is the time it takes for the Nth line to scan to C. The range to the target may be considered to be a direct function of the size or intensity of the target image detected. By sampling the peak intensity and/or computing the average difference between detection and loss of detection for every image line or perhaps even just the largest difference, denoted by D, an approximate measure of range may be obtained. When the target is illuminated by a point source the center most pixel will be the most intense, and its intensity will be a function of range.

Figure 5:
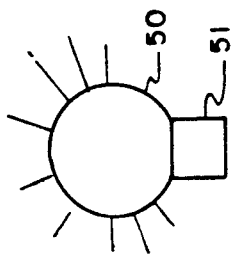
FIG. 5 shows an omnidirectional target marker for use with the ATLIS system of FIG. 1.
Figure 6:
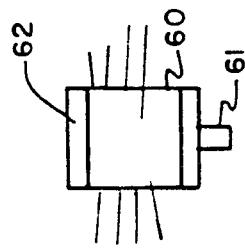
FIG. 6 shows a marker sufficiently omnidirectional for the present invention.
Figure 7:
FIG. 7 shows a unidirectional marker which can be rotated for the present invention.

FIGS. 5-7 show various types of target markers that can be used. The spherical filter type shown in FIG. 5 has the advantage of presenting the same profile in every direction and can easily be made by blowing techniques dip coating and the like. The spherical filter 50 is mounted on a fixed base 51 containing the usual socket for a point source bulb. It works best with point source illuminators. The cylindrical filter type of FIG. 6 allows the filter to be formed in a flat sheet before assembly. The flat sheet is then formed into cylinder 60 and it is mounted on a base 61 with a socket to accommodate a vertical line source or elongated filament bulb. An opaque or reflecting disc-like top completes the marker. It also has the same profile in any direction normal to its vertical axis and works best with a line source illuminator. Since its profile occupies the same length along each target intercepted video scan line on the monitor, each such line's data can be considered a measure of range or all such lines averaged for somewhat better accuracy. FIG. 7 shows a searchlight type marker 71 which uses a simple disk shaped filter 70. It has the disadvantage that it must be constantly directed at the camera, but, since it is likely to be found on many targets, it may be preferred in some tests, if the operator can spare the time.

We claim:

1. A method to record the identity and position of a plurality of moving targets, as a function of real time as well as corresponding identities and positions obtained by an ATR system undergoing test; comprising of the following steps:

A. Mounting and arranging a source of visible radiation on each target, the source being limited to a narrow band of wavelengths unique for each target;

B. Scanning the targets with a TV-type camera so as to obtain a standard video signal defining a series of fields divided into scan lines and the latter divisible into pixels with different analog values;

C. Introducing a filter, having the same bandwidth as one of the above sources, between the camera and the targets for a sampling period equal to at least two consecutive field scans;

D. Sampling the intensity and x-y position of each pixel within said sampling period;

E. Permanently storing the x-y position and intensity of at least the most intense pixel in each line, during the sampling period;

F. Reading and storing a digital bar code identification of the filter associated with the sampling period and all target data generated by at least one ATR being tested during the same period.

2. The method according to claim 1 wherein Step E further includes:

prestoring the first and last pixel in each line having an intensity above a preselected threshold which is substantially below the intensity of said most intense pixel.

3. The method according to claim 1 wherein said method includes a further step between Step E and Step F comprising:

EF. Computing and permanently storing an average x-y position and the average difference between the first and last x-y positions for each line; from all the prestored x-y positions from the same sampling period.

4. A system for recording the position and identity of a group of moving targets, during an ATR test, comprising:

a narrow-band light source mounted on each of said targets, with bandwidth of each source being different;

a multi-aperture rotating shutter mounted in the optical path of said camera, said shutter having a set of apertures each covered by a matched band-pass filter for one of said targets;

motor means coupled between said camera and said shutter and synchronized with said camera to rotate a different one of said filters sequentially into said optical path for an integral number of fields;

a computer to normalize digital x-y position and intensity data for each target;

an analog to digital converter means coupled between said camera and said computer to sample said synchronization and video signals for each pixel to digitally define its x-y position and intensity; and a recorder to record said normalized data as well as data from any ATR, as a function of the angular position of said shutter means.

5. A system according to claim 4, further including:

a set of bar codes each separately defining a different one of said apertures and each identically angularly oriented to the aperture it defines;

bar code reading means mounted in fixed relation to said camera, oriented to scan each bar code on said shutter as its corresponding filter is activated and electronically coupled to said recorder to digitally input that position of said shutter to said recorder.

* * * * *